(12) United States Patent
Ogata

(10) Patent No.: US 8,503,273 B2
(45) Date of Patent: Aug. 6, 2013

(54) OPTICAL DISC DEVICE AND RECORDING METHOD

(75) Inventor: Takeshi Ogata, Kawasaki (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 13/429,467

(22) Filed: Mar. 26, 2012

(65) Prior Publication Data

US 2012/0250482 A1     Oct. 4, 2012

(30) Foreign Application Priority Data

Mar. 30, 2011   (JP) ................................. 2011-073875

(51) Int. Cl.
*G11B 7/00*     (2006.01)

(52) U.S. Cl.
USPC .................. 369/44.32; 369/44.37; 369/53.19; 369/94; 369/103

(58) Field of Classification Search
None
See application file for complete search history.

(56) References Cited

U.S. PATENT DOCUMENTS

| | | | |
|---|---|---|---|
| 2009/0147652 A1 | 6/2009 | Fujita | |
| 2011/0134732 A1* | 6/2011 | Miyamoto et al. | 369/44.32 |

FOREIGN PATENT DOCUMENTS

| | | |
|---|---|---|
| JP | 2001-357542 | 12/2001 |
| JP | 2009-140552 | 6/2009 |

* cited by examiner

*Primary Examiner* — Wayne Young
*Assistant Examiner* — Brian Butcher
(74) *Attorney, Agent, or Firm* — Antonelli, Terry, Stout & Kraus, LLP

(57) ABSTRACT

An optical disc device and a recording method is provided in which information can be additionally recorded on an optical disc, which has a servo layer and recording layers separately formed, by accurately correcting a relative angle between a light beam and the optical disc used in the previous recording without providing an area where recording is not performed while maintaining the stability of tracking servo. The above subject can be solved by studying with high accuracy the relative angle between the optical disc and the optical axis used in the previous recording by applying a radial tilt servo according to a signal from the recording layers with the tracking servo applied by the servo layer. Further, the additional recording can be performed stably by fixing the radial tilt at the previously studied angle when the recording is performed.

14 Claims, 7 Drawing Sheets

SPIRAL IN INNER CIRCUMFERENTIAL DIRECTION

OPTICAL DISC DEVICE AND RECORDING METHOD

INCORPORATION BY REFERENCE

The present application claims priority from Japanese application JP2011-073875 filed on Mar. 30, 2011, the content of which is hereby incorporated by reference into this application.

TECHNICAL FIELD

The present invention relates to an optical disc device and a recording method for recording and/or reproducing information on and/or from an optical disc having a servo layer and a recording layer formed separately.

BACKGROUND OF THE INVENTION

There have been developed optical discs having a servo layer and a recording layer formed separately. The optical disc drive of Japanese Patent Application Laid-Open No. 2009-140552 records information by using two types of light beams, which are respectively focused on the servo layer and the recording layer, and performing control in a radial direction based on a signal recorded on the servo layer.

SUMMARY OF THE INVENTION

A relative angle between the light beam and the optical disc is variable depending on a temperature, an optical disc chucking state, etc. In a case where information is additionally recorded on the above optical disc, there is a problem that a recording position on the recording layer is variable depending on the relative angle between the light beam and the optical disc, and the added information is written over the previously recorded data.

Japanese Patent Application Laid-Open No. 2009-140552 describes, "In a case where new information is recorded on a recording layer having a recorded area where information is already recorded, it is determined to provide a termination recognition section which recognizes the termination of the recorded area, and a target position setting section which sets a target position to separate a terminal end of the recorded area and a start end of a recording planned area where information is newly recorded by only an arbitrary number of guard tracks." This method has a problem that a useless area which does not record is formed and the storage capacity in a recording surface is decreased.

Japanese Patent Application Laid-Open No. 2001-357542 describes, "It can be configured that the optical axis deviation detection means detects the optical axis deviation amount based on the tracking error signal for servo and the tracking error signal for recording/reproducing, and the compensation means performs tracking on a desired guide track based on the tracking error signal for servo and compensates the tracking error signal for servo by the optical axis deviation amount only so as to irradiate the light beam for recording/reproducing onto the desired guide track." Since this method compensates according to a track offset signal, it has a problem that when a correction amount is large, the tracking error signal has a large deviation in balance, and the stability of a tracking servo lowers.

The present invention provides an optical disc device and a recording method in which additional recording can be performed by accurately correcting a relative angle between the light beam and the optical disc used in the previous recording without providing an area where recording is not performed while maintaining the stability of a tracking servo.

For example, the above-described problems are improved by the present invention which studies with high accuracy a relative angle between an optical axis and an optical disc used in the previous recording by applying a tilt servo by a signal from the recording layer in a state that the tracking servo is applied by a servo layer.

Recording can be performed continuously with stability next to the previously recorded data by accurately studying the relative angle between the optical disc and the optical axis set at the time of previous recording before additional recording on the disc is started.

Other objects, features and advantages of the invention will become apparent from the following description of the embodiments of the invention taken in conjunction with the accompanying drawings.

DETAILED DESCRIPTION

Figure 1:
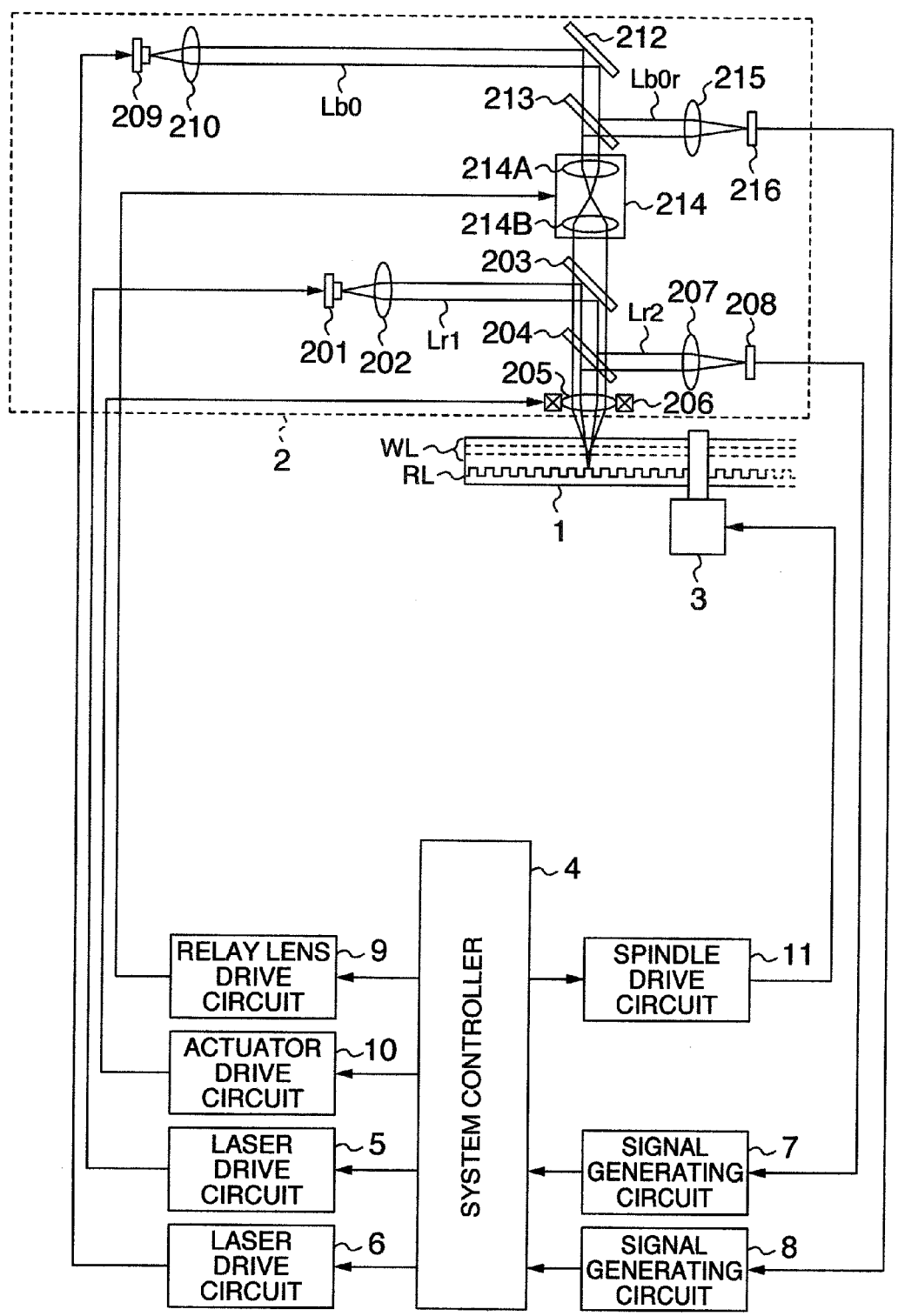
FIG. 1 is a block diagram showing a structure of the optical disc recording/reproducing apparatus according to an embodiment.

Embodiments of the invention will be described below with reference to the drawings. FIG. 1 is a block diagram showing a structure of the optical disc recording/reproducing apparatus according to the embodiment.

Figure 2:
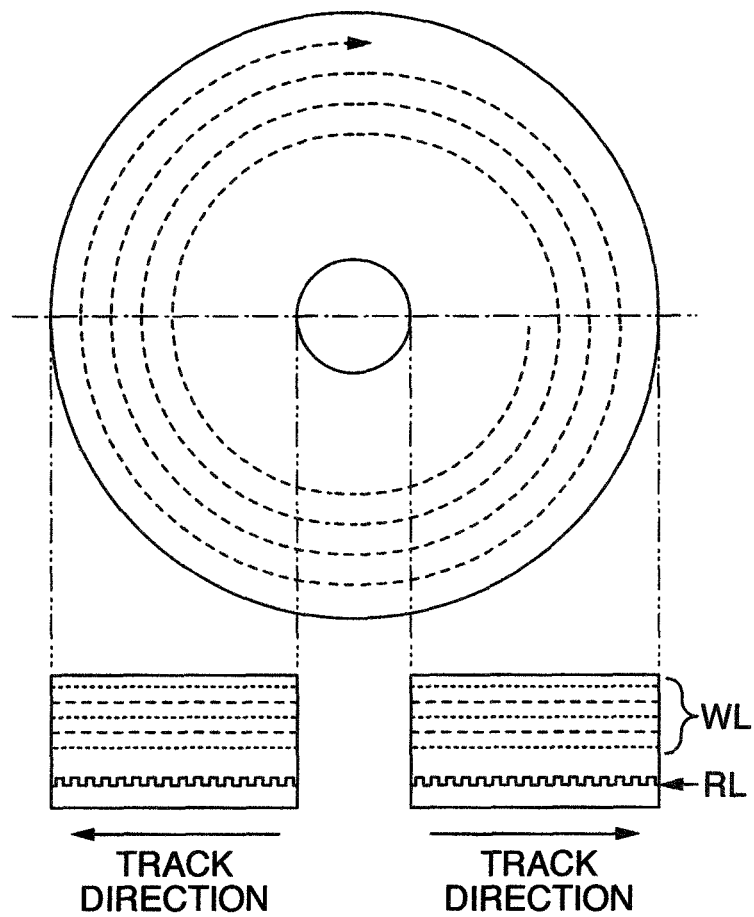
FIG. 2 is a schematic diagram showing that the spiral direction of the track of a servo layer RL of an optical disc 1 is an outer circumferential direction.
Figure 3:
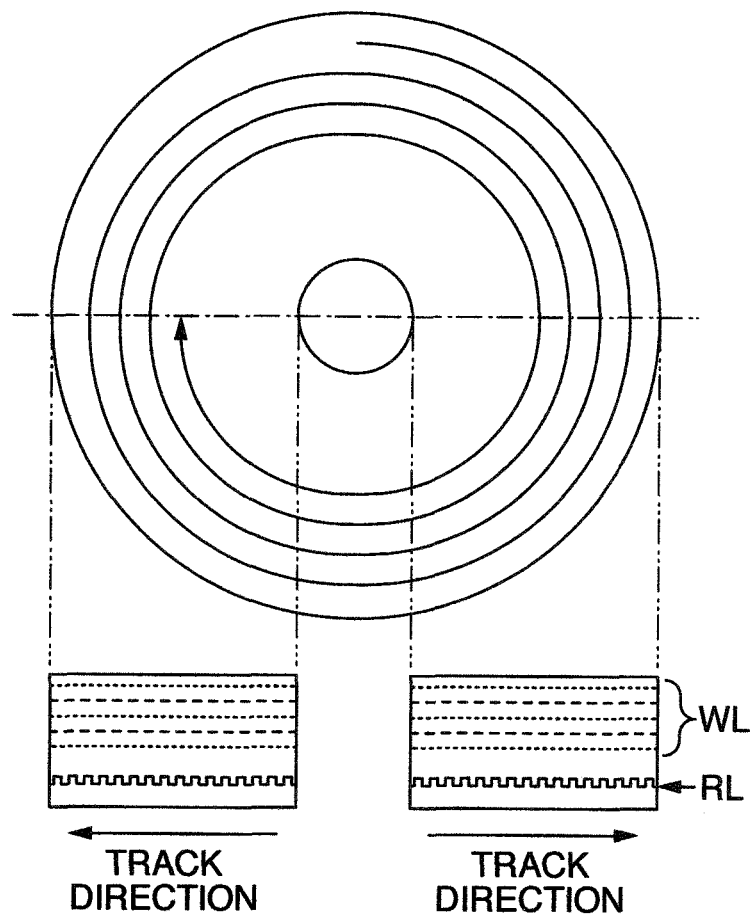
FIG. 3 is a schematic diagram showing that the spiral direction of the track of the servo layer RL of the optical disc 1 is an inner circumferential direction.

As shown in FIG. 2 and FIG. 3, an optical disc 1 has a servo layer RL on which formed is a guide track as a guide groove with the address of a track for recording or reproducing and information peculiar to the disc for recording or reproducing wobbled, and a plurality of recording layers WL capable of recording user data with distances different from the servo layer RL.

The guide track of the servo layer RL is formed in a spiral form. The spiral direction of the guide track may be either an outer circumferential direction as shown in FIG. 2 or an inner circumferential direction as shown in FIG. 3.

An optical pickup 2 is comprised of a servo optical system that performs servo-control of the servo layer RL, reproduces the address of a track and the information peculiar to the disc from the wobbled guide track, and records/reproduces information and the like for managing data to be recorded on the recording layers, and an information optical system that records/reproduces data on/from the plurality of recording layers having different distances from the servo layer RL.

First, a recording operation is described below. In the optical pickup 2, a laser 201 for servo is a semiconductor laser which outputs, for example, a red light beam having a wavelength of about 650 nm. It outputs a red light beam Lr1 of a predetermined light quantity according to the control of a laser drive circuit 5 to enter into a collimator lens 202. The collimator lens 202 converts the red light beam Lr1 from diverging light to parallel light and enters it into a beam splitter 203. The beam splitter 203 has wavelength selectivity (dichroic property) with reflectance variable depending on the wavelength of the light beam, reflects the light beam having a wavelength of about 650 nm at a ratio of substantially 100%, and allows a light beam having a wavelength of about 405 nm to penetrate at a ratio of substantially 100%. Thus, the red light beam Lr1 having the wavelength of about 650 nm is reflected at a ratio of substantially 100% and entered into a next beam splitter 204. The red light beam Lr1 transmitted through the beam splitter 204 is entered into an objective lens 205. The objective lens 205 condenses the red light beam Lr1 to focus into the servo layer RL by transmitting through the recording layers WL of the optical disc 1. At this time, the red light beam Lr1 is reflected by the servo layer RL of the optical disc 1 and becomes a red reflected light beam Lr2 which is forwarded in a direction opposite to that of the red light beam Lr1.

The red reflected light beam Lr2 is converted to parallel light by the objective lens 205 and entered into the beam splitter 204. At this time, the red reflected light beam Lr2 is reflected by the beam splitter 204 and entered into a condenser lens 207. The condenser lens 207 converges the red light beam Lr2 to irradiate into a photodetector 208. A signal generating circuit 7 generates from the output of the photodetector 208 a signal for servo control such as a focus error signal, a tracking error signal and the like, a rotation synchronizing signal for controlling the rotation of the optical disc 1 and a signal for reproducing the address of the guide track from the wobbled guide track formed on the servo layer RL, and a signal for reproducing disc-specific information such as the intensity of light beam for recording on the recording layers WL or information for controlling user data recorded on the recording layers WL, and outputs to a system controller 4. The system controller 4 outputs a focus control signal and a tracking control signal to an actuator drive circuit 10 according to the focus error signal and the tracking error signal from the signal generating circuit 7. And, the system controller 4 outputs a spindle control signal to a spindle drive circuit 11 according to the rotation synchronizing signal outputted from the signal generating circuit 7. The disc 1 mounted on a spindle motor 3 is controlled to a predetermined rotation speed by driving the spindle motor 3 by the output of the spindle drive circuit 11.

The guide track formed on the servo layer RL of the optical disc 1 is formed in a spiral form as shown in FIG. 2, and it is possible to record or reproduce sequentially from the inner circumference to the outer circumference of the disc 1 by performing tracking control so that the red light beam Lr1 follows the guide track of the servo layer.

As described above, the servo optical system of the optical pickup 2 irradiates the red light beam Lr1 to the servo layer RL of the optical disc 1, and based on the result of receiving the red reflected light beam Lr2 as the reflected light, performs focus control and tracking control of the objective lens 205 according to the control by the system controller 4, thereby making the red light beam Lr1 follow the guide track of the servo layer RL. Considering an influence of coma aberration due to inclination of the optical disc 1 during the recording on or reproduction from the servo layer RL with the red light beam, it is desirable that a distance from the surface of the optical disc 1 on the side, where the red light beam is incident, to the servo layer RL is determined to be about 0.6 mm.

In the information optical system, a recording/reproducing laser 209 is a semiconductor laser for outputting, for example, a blue light beam having a wavelength of about 405 nm and outputs a blue light beam Lb0 of a predetermined light quantity according to the control of a laser drive circuit 6 to enter into a collimator lens 210. The collimator lens 210 converts the blue light beam Lb0 from diverging light to parallel light, which is then reflected by a mirror 212 and entered into a beam splitter 213. The blue light beam Lb0 which has transmitted through the beam splitter 213 is entered into a relay lens 214. The relay lens 214 converts the blue light beam Lb0 from parallel light to convergent light or diverging light by a movable lens 214A, a convergent condition of the blue light beam Lb0 is further changed by a fixed lens 214B, and the blue light beam Lb0 is entered into the beam splitter 203. Here, the movable lens 214A is configured to move in the optical axis direction of a blue light beam Lb1 by an unshown actuator, and the movable lens 214A is moved according to the output of a relay lens drive circuit 9 to change the convergent condition of the blue light beam Lb0 outputted from the fixed lens 214B.

The beam splitter 203 transmits the blue light beam Lb0 depending on its wavelength and enters it into the beam splitter 204. The beam splitter 204 transmits the blue light beam Lb0 at a predetermined ratio and enters it into the objective lens 205. The objective lens 205 condenses the blue light beam Lb1 to focus into the recording layers WL of the optical disc 1. Here, the position of a blue light focal point Fb1 of the blue light beam Lb0 is determined according to the convergent condition at the time of output from the fixed lens 214B of the relay lens 214. That is, the blue light focal point Fb1 is shifted in the focus direction within the recording layers WL according to the position of the movable lens 214A. Thus, the blue light beam Lb1 is irradiated to the optical disc 1 to position the blue light focal point Fb1 in the recording layers WL, and a depth of the focal point Fb1 from the servo layer RL is adjusted according to the position of the movable lens 214A of the relay lens 214. It is designed such that a moving distance of the movable lens 214A and that of the blue light focal point Fb1 of the blue light beam Lb0 are substantially in a proportional relation, and for example, when the movable lens 214A is moved 1 mm, the blue light focal point Fb1 of the blue light beam Lb0 moves 30 µm.

A blue beam Lb0r reflected by the recording layers WL is sequentially entered into the objective lens 205, the beam splitter 204, the beam splitter 203 and the relay lens 214 to become parallel light, which is then entered into the beam splitter 213. The blue reflected light beam Lb0r reflected by the beam splitter 213 is entered into a condenser lens 215. The condenser lens 215 converges the blue reflected light beam Lb0r to irradiate on a photodetector 216. A signal generating circuit 8 generates signals for servo control such as a recording layer focus error signal and a mark tracking error signal from the output of the photodetector 216, and a rotation synchronizing signal for controlling the rotation of the optical disc 1, a signal for reproducing the address of the track, and a signal for reproducing the recorded user data from the mark track recorded on the recording layers WL, and outputs to the system controller 4. The system controller 4 outputs a focus control signal to the relay lens drive circuit 9 and a tracking control signal or a radial tilt control signal to the actuator drive circuit 8 according to the recording layer focus error signal and the recording mark tracking error signal from the signal generating circuit 8.

The objective lens 205 is configured to move integrally with an actuator 206, and the actuator 206 is driven in a focus direction, a tracking direction and a radial tilt direction according to the output of the actuator drive circuit 10 to perform servo control so that the red light beam Lr1 follows the guide track in a state focused on the servo layer RL.

In addition, the movable lens 214A moves according to the output of the relay lens drive circuit 9 and performs the servo control of the blue light focal point Fb1 to thereby follow the recording layers WL to perform recording or reproducing.

Subsequently, the output of the recording/reproducing laser 209 is changed to recording output to form a mark on the recording layers WL, and information can be recorded. Thus, a mark track formed of a recorded mark row is formed on the recording layers.

A reproduction operation will be described below. At the time of reproduction, the system controller 4 performs servo control to move the movable lens 214A and the objective lens 205 in the focus direction and the tracking direction according to the recording layer focus error signal and the mark track error signal to position the blue light focal point Fb1 on the mark recorded on the recording layers WL desired to be reproduced. And, the system controller 4 reproduces information according to a change of the blue reflected beam Lb0r incident on the photodetector 216.

Figure 5:
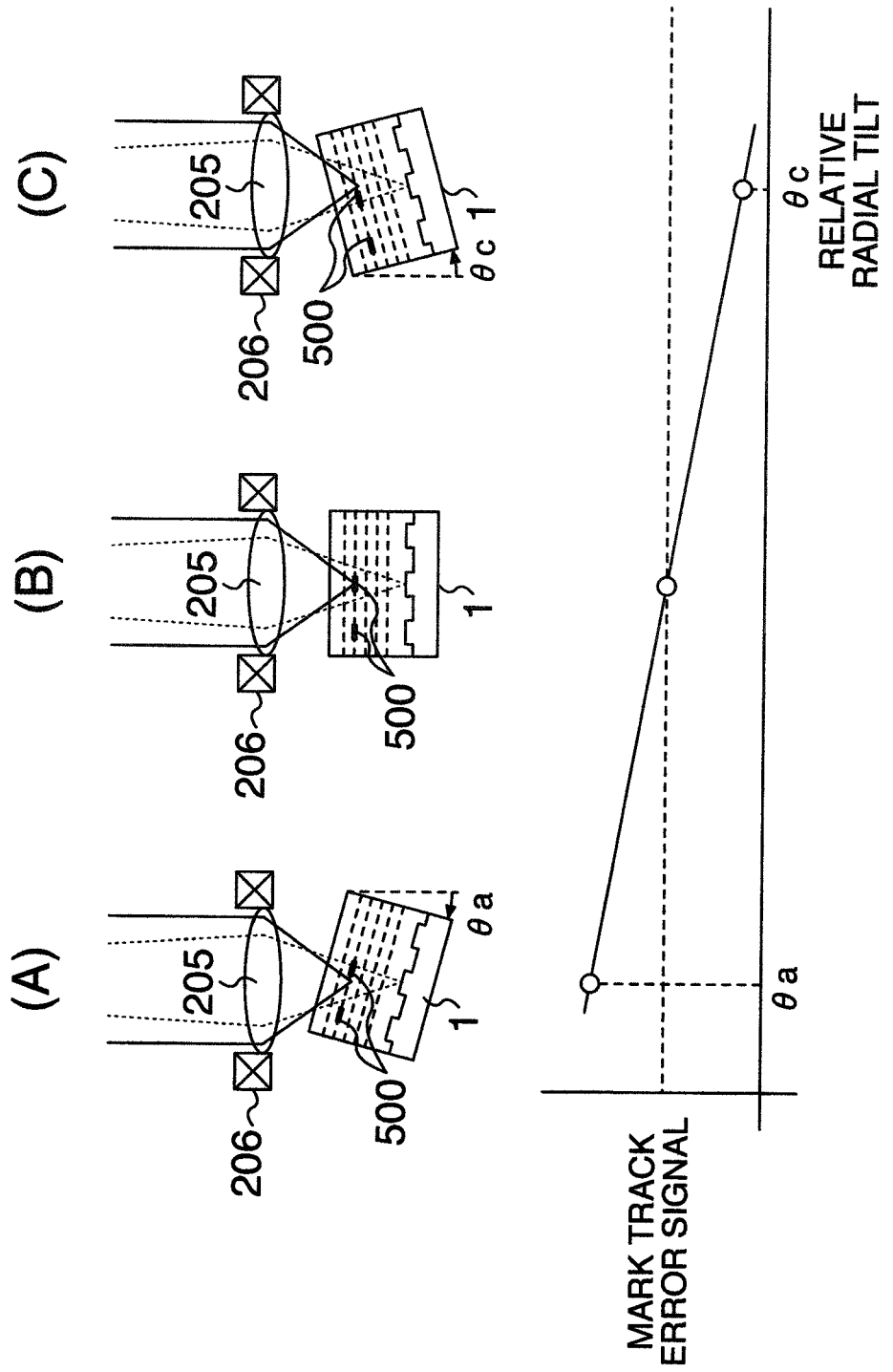
FIG. 5 is a schematic diagram showing a relationship between a radial tilt and a mark track error signal of an optical disc.

FIG. 5 shows output of a mark track error signal when a tracking servo is performed by a track error signal of the servo layer RL with a mark 500 recorded on the recording layers WL and when a relative radial tilt of the optical disc 1 to the optical disc recording/reproducing apparatus is different from the time when the mark 500 is formed. If there is no relative radial tilt difference from the case of forming the mark 500, a mark track error signal becomes error 0 as shown in state (B) in FIG. 5.

As shown in states (A) and (C) in FIG. 5, if there is a relative radial tilt difference θa or θc, an error of the mark track error signal is detected according to the size and direction of the radial tilt difference. Therefore, reading can be performed with the relative radial tilt same as in the recording by performing a radial tilt servo based on the mark track error signal.

Figure 6:
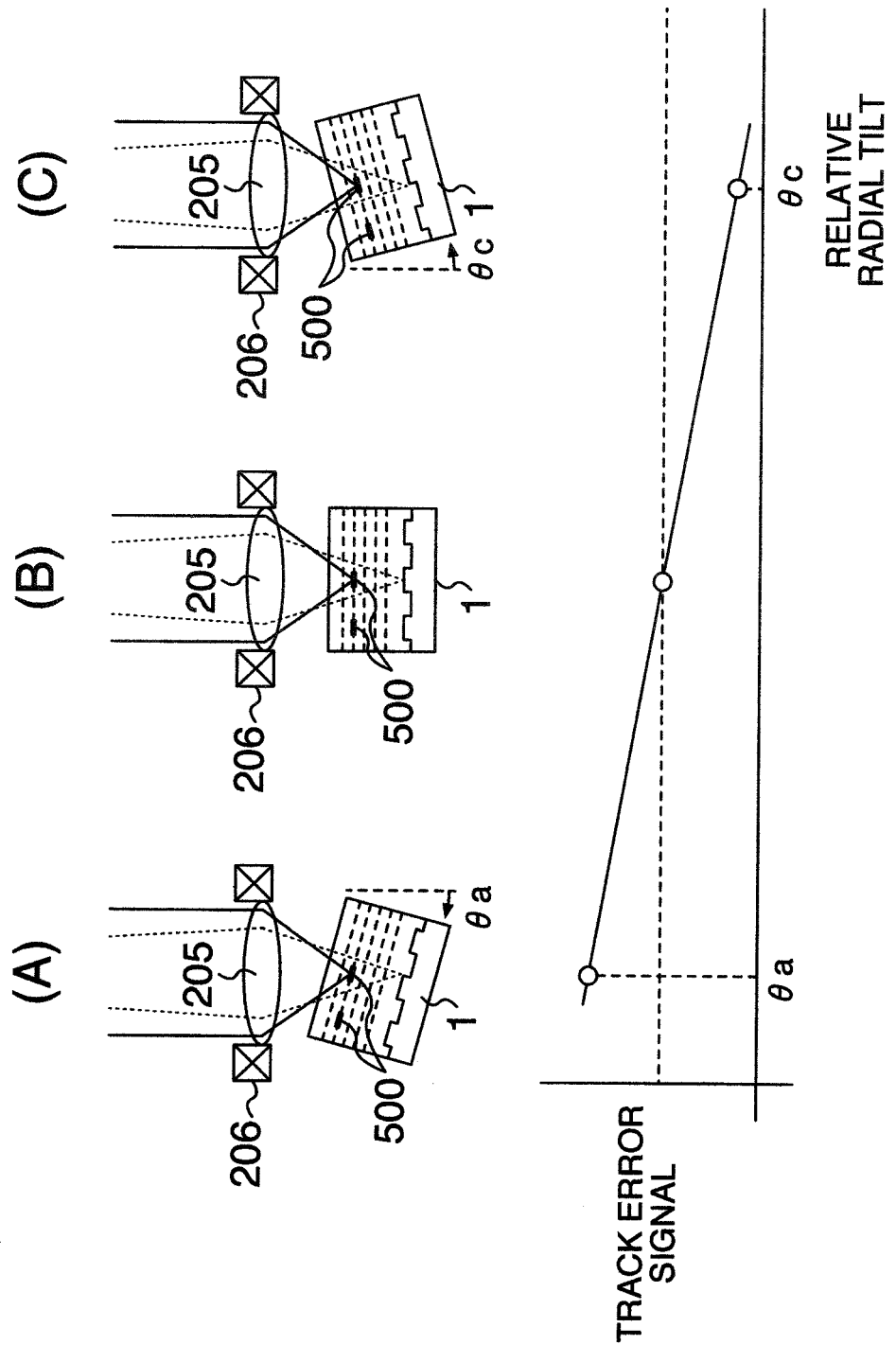
FIG. 6 is a schematic diagram showing a relationship between a radial tilt and a track error signal of an optical disc.

FIG. 6 shows output of a track error signal in a case where a tracking servo is applied according to the mark track error signal of the recording layers WL with the mark 500 recorded on the recording layers WL, and the relative radial tilt of the optical disc 1 and the optical disc recording/reproducing apparatus is different from that when the mark 500 is formed. If there is not a relative radial tilt difference from that when the mark 500 is formed, the track error signal has error 0 as shown in state (B) in FIG. 6.

As shown in states (A) and (C) in FIG. 6, if there is a relative radial tilt difference θa or θc, an error of the track error signal is detected according to the size and direction of the radial tilt difference. Therefore, it is easy to read out with the relative radial tilt same as in the recording by performing a radial tilt servo based on the track error signal.

Here, to reproduce information, it is appropriate when the blue light focal point Fb1 can be positioned on the mark where reproduction is performed. For example, the red light beam Lr1 is focused on the servo layer RL in the same manner as in recording, and servo control may be carried out to drive the actuator 206 in a focusing direction according to a focus error signal, in a tracking direction according to a track error signal and in a radial tilt direction according to a mark track error signal, and to drive the movable lens 214A according to a recording focus error signal.

Figure 4:
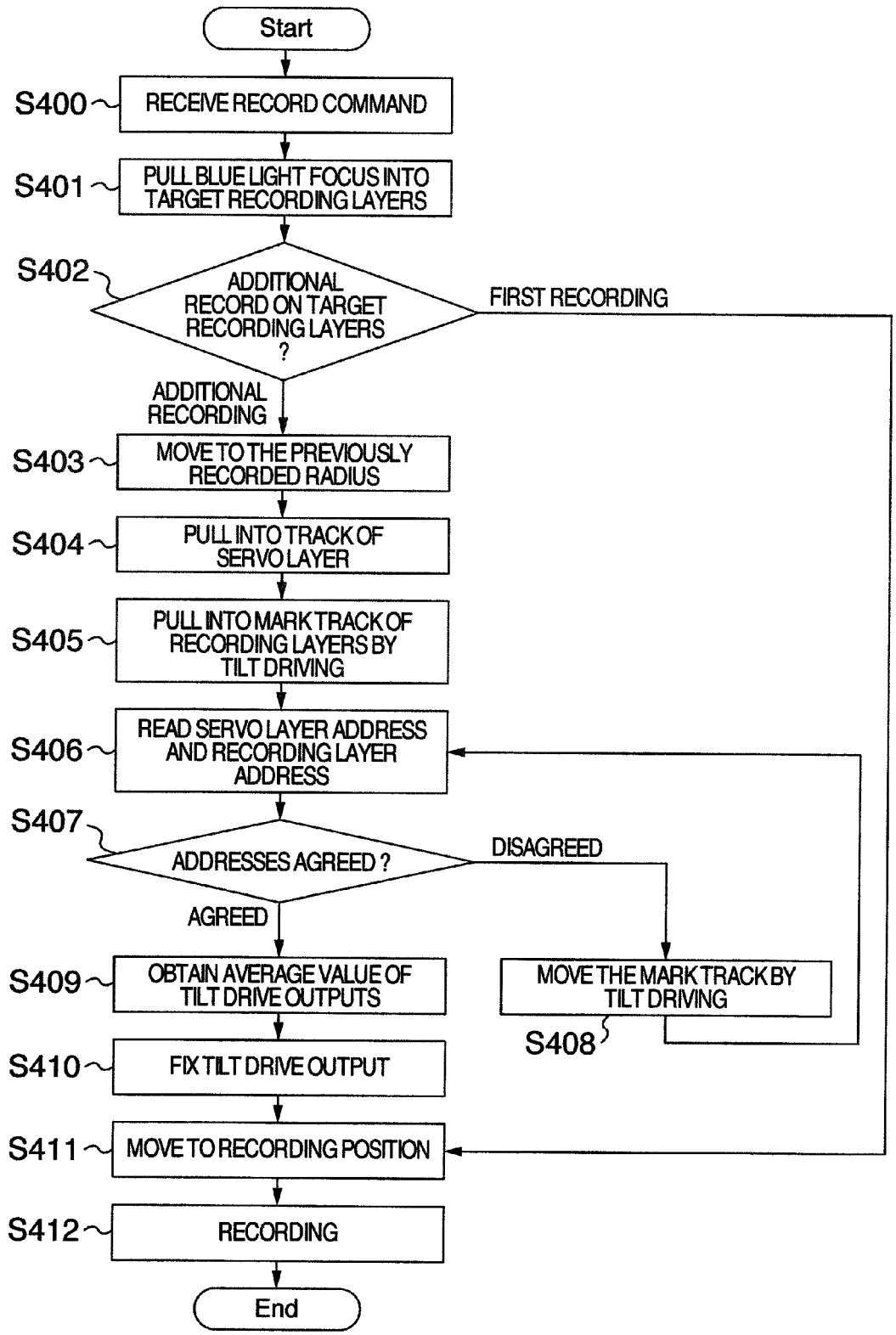
FIG. 4 is a flow chart showing an additional recording procedure of the optical disc device of the invention.

An additional recording procedure of information by the optical disc recording/reproducing apparatus of the invention is described below with reference to the flow chart of FIG. 4. First, the optical disc recording/reproducing apparatus has recognized the optical disc and also acquired information on up to what part of the recording layers WL has recorded.

When an additional record command is received from a host (S400), the focal point of the blue light beam Lb0 is located on the target recording layers WL, and focus pull-in is carried out (S401). It is then judged whether information recording is performed for the first time (S402). If recording on the recording layers is carried out for the first time, movement to an address where recording is carried out is made based on an address read from the servo layer RL (S411). Then, the recording operation is performed as described above (S412).

If recording has been made before, study is made to decide a radial tilt angle at the time of additional recording. The study is made by moving to the radius where the previous recording was carried out (S403) and driving the objective lens 206 in the tracking direction to pull into the track of the servo layer RL (S404). Then, the objective lens 206 is driven in the radial tilt direction and the mark track error signal is used as described above to perform servo pull-in such that the blue light focal point Fb1 is set on the mark track recorded on the recording layers WL (S405).

Subsequently, the address recorded in the mark track of the recording layers WL and the address recorded in the track of the servo layer RL are read out (S406). The two read-out addresses are compared (S407), and if they do not agree mutually, the objective lens 206 is driven in the radial tilt direction, and the blue light focal point Fb1 is moved to the mark track which agrees with the address read out from the servo layer RL to perform servo pull-in (S408). If the two read-out addresses agree mutually, an average value of the servo outputs carrying out the radial tilt drive is obtained (S409). The output of the radial tilt drive of the actuator drive circuit 10 is fixed to the average value (S410). Subsequently, the blue light focal point Fb1 is moved to the position where recording is carried out (S411), and recording is carried out as described above (S412).

By adding a study before recording as described above, it becomes possible to perform additional recording in a state that correction is made to have a radial tilt angle at which the relative position between the track of the servo layer RL and the blue light focal point Fb1 of the recording layers WL becomes the same as that in the previous recording, and additional recording can be carried out stably even if the relative angle between the light beam and the optical disc is varied due to a temperature, an optical disc chucking state or the like. And, stable additional recording can be carried out by fixing the tilt to the angle studied at the time of recording.

Figure 7:
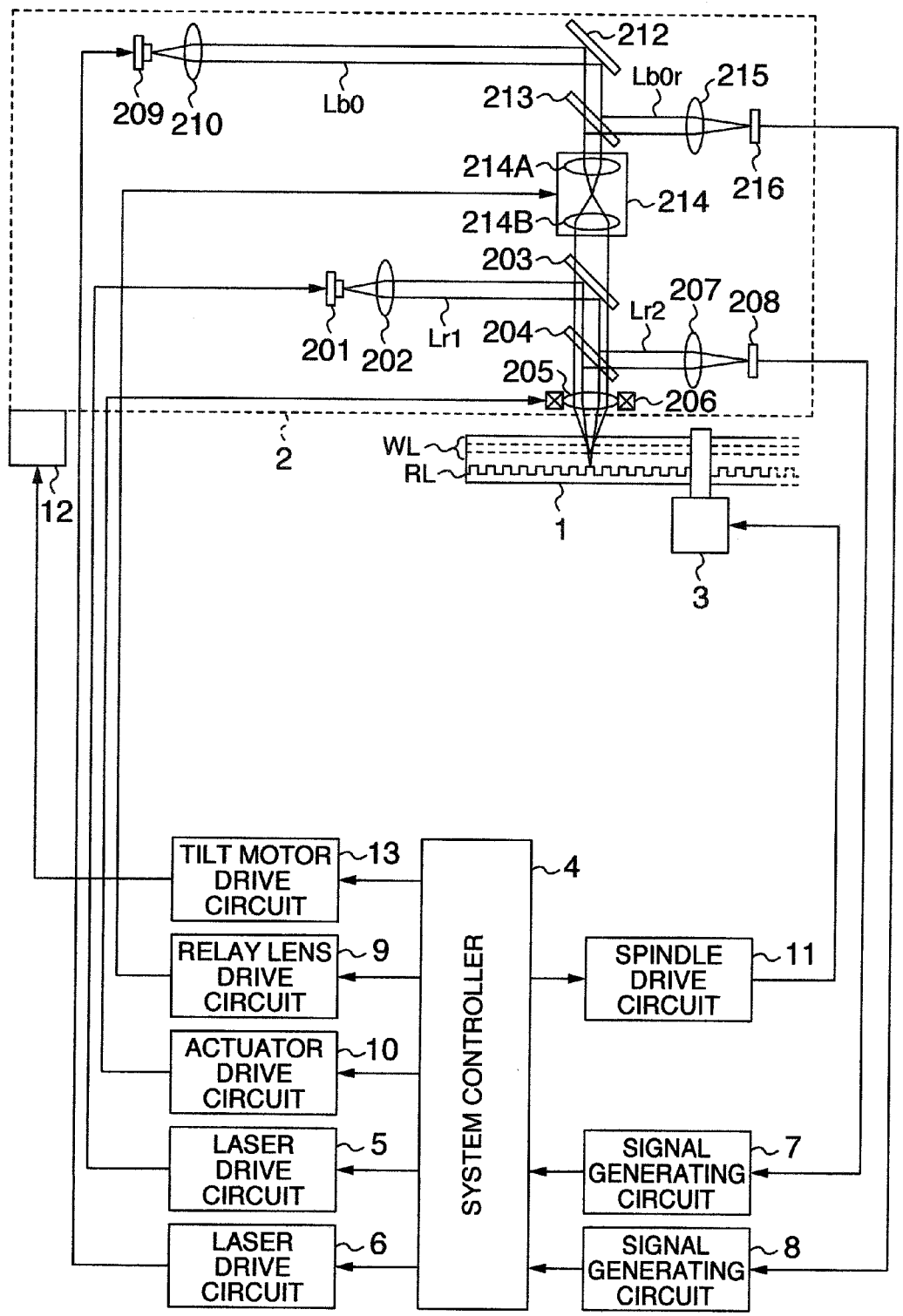
FIG. 7 is a block diagram showing a structure of the optical disc recording/reproducing apparatus according to another embodiment of the invention.

The drive in the radial tilt direction was achieved by driving the objective lens 205 in the radial tilt direction, but if the relative position between the focal point of the red light beam and the blue light focal point Fb can be moved in the radial tilt direction, another method can be used. For example, the optical pickup 2 itself may be tilted by disposing the tilt motor drive circuit 13 and the tilt motor 12 as shown in FIG. 7. Otherwise, it may be configured to tilt the spindle motor 3.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disc device for recording/reproducing information on a multilayer optical disc which has a servo layer having a guide track and a plurality of recording layers for recording/reproducing information, comprising:
   a light source for servo configured to irradiate a light beam for servo to the servo layer;
   a recording/reproducing light source configured to irradiate a recording/reproducing beam to the recording layers;
   an objective lens configured to condense the light beam for servo and the recording/reproducing beam;
   a track error detection unit configured to detect a first deviation amount between the optical axis of the light beam for servo and the guide track from the reflection of the light beam for servo;
   a radial tilt error detection unit configured to detect a second deviation amount between the optical axis of the recording/reproducing beam and the recorded mark from the reflection of the recording/reproducing beam;
   a track actuator configured to move the objective lens in a radial direction; and
   a radial tilt actuator configured to tilt the objective lens;
   wherein:
   the first deviation amount from the guide track is corrected by the track actuator,
   the second deviation amount from the recorded mark is corrected by the radial tilt actuator,
   the guide track is added with address information which becomes position information, and
   when servo address information read from the light beam for servo does not agree with reproduction address information read from the recording/reproducing beam, the radial tilt actuator is moved to agree the reproduction address information with the servo address information.

2. An optical disc device for recording/reproducing information on a multilayer optical disc which has a servo layer having a guide track and a plurality of recording layers for recording/reproducing information, comprising:
   a light source for servo configured to irradiate a light beam for servo to the servo layer;
   a recording/reproducing light source configured to irradiate a recording/reproducing beam to the recording layers;
   an objective lens configured to condense the light beam for servo and the recording/reproducing beam;
   a track error detection unit configured to detect a first deviation amount between the optical axis of the light beam for servo and the guide track from the reflection of the light beam for servo;
   a radial tilt error detection unit configured to detect a second deviation amount between the optical axis of the recording/reproducing beam and the recorded mark from the reflection of the recording/reproducing beam;
   a track actuator configured to move the objective lens in a radial direction; and
   a radial tilt actuator configured to tilt the objective lens;
   wherein:
   the second deviation amount from the recorded mark is corrected by the track actuator, and
   the first deviation amount from the guide track is corrected by the radial tilt actuator.

3. The optical disc device according to claim 1, wherein an angle of the radial tilt actuator is fixed when the recording/reproducing beam is used to record information on the recording layers.

4. The optical disc device according to claim 3, wherein the fixed tilt has a value for correction of a deviation amount from the recorded mark.

5. The optical disc device according to claim 2, wherein the first deviation amount from the guide track is corrected by the track actuator at the time of starting the recording.

6. The optical disc device according to claim 1,
   wherein to additionally record information on the multilayer optical disc, a track of the servo layer is taken in at a radial position, where recording was performed, before the additional recording is performed, and the radial tilt actuator is driven until reproduction address information, read from the recording/reproducing beam, agrees with servo address information read from the light beam for servo; and
   wherein additional recording of information is performed by the drive output of the radial tilt actuator by which the reproduction address information read from the recording/reproducing beam has agreed with the servo address information read from the light beam for servo.

7. A recording method for recording information on a multilayer optical disc which has a servo layer having a guide track and a plurality of recording layers for recording/reproducing information, comprising:
   irradiating a light beam for servo to the servo layers;
   irradiating a recording/reproducing beam to the recording layers;
   condensing the light beam for servo and the recording/reproducing beam by an objective lens;
   detecting a first deviation amount between the optical axis of the light beam for servo and the guide track from the reflected light of the light beam for servo;
   detecting a second deviation amount between the optical axis of the recording/reproducing beam and the recorded mark from the reflected light of the recording/reproducing beam;
   correcting the first deviation amount from the guide track by a track actuator configured to move the objective lens in a radial direction; and
   correcting the second deviation amount from the recorded mark by a radial tilt actuator configured to tilt the objective lens;
   wherein:
   the guide track is added with address information which becomes position information, and
   when servo address information read from the light beam for servo does not agree with reproduction address information read from the recording/reproducing beam, the radial tilt actuator is moved to agree the reproduction address information with the servo address information.

8. A recording method for recording information on a multilayer optical disc which has a servo layer having a guide track and a plurality of recording layers for recording/reproducing information, comprising:
   irradiating a light beam for servo to the servo layer;
   irradiating a recording/reproducing beam to the recording layers;
   condensing the light beam for servo and the recording/reproducing beam by an objective lens;
   detecting a first deviation amount between the optical axis of the light beam for servo and the guide track from the reflected light of the light beam for servo;
   detecting a second deviation amount between the optical axis of the recording/reproducing beam and the recorded mark from the reflected light of the recording/reproducing beam;

correcting the second deviation amount from the recorded mark by a track actuator configured to move the objective lens in a radial direction; and correcting the first deviation amount from the guide track by a radial tilt actuator configured to tilt the objective lens.

9. The recording method according to claim 7, wherein to additionally record information on the multi-layer optical disc, a track of the servo layer is taken in at a radial position, where recording was performed, before the additional recording is performed, and the radial tilt actuator is driven until reproduction address information read from the recording/reproducing beam agrees with servo address information read from the light beam for servo; and wherein additional recording of information is performed by the drive output of the radial tilt actuator by which the reproduction address information read from the recording/reproducing beam is agreed with the servo address information read from the light beam for servo.

10. The optical disc device according to claim 2, wherein the guide track is added with address information which becomes position information; and wherein when servo address information read from the light beam for servo does not agree with reproduction address information read from the recording/reproducing beam, the radial tilt actuator is moved to agree the reproduction address information with the servo address information.

11. The optical disc device according to claim 2, wherein an angle of the radial tilt actuator is fixed when the recording/reproducing beam is used to record information on the recording layers.

12. The optical disc device according to claim 2, wherein to additionally record information on the multi-layer optical disc, a track of the servo layer is taken in at a radial position, where recording was performed, before the additional recording is performed, and the radial tilt actuator is driven until reproduction address information read from the recording/reproducing beam agrees with servo address information read from the light beam for servo; and wherein additional recording of information is performed by the drive output of the radial tilt actuator by which the reproduction address information read from the recording/reproducing beam has agreed with the servo address information read from the light beam for servo.

13. The recording method according to claim 8, wherein the guide track is added with address information which becomes position information; and wherein when servo address information read from the light beam for servo does not agree with reproduction address information read from the recording/reproducing beam, the radial tilt actuator is moved to agree the reproduction address information with the servo address information.

14. The recording method according to claim 8, wherein to additionally record information on the multi-layer optical disc, a track of the servo layer is taken in at a radial position, where recording was performed, before the additional recording is performed, and the radial tilt actuator is driven until reproduction address information read from the recording/reproducing beam agrees with servo address information read from the light beam for servo; and wherein additional recording of information is performed by the drive output of the radial tilt actuator by which the reproduction address information read from the recording/reproducing beam is agreed with the servo address information read from the light beam for servo.

* * * * *